US006969029B2

(12) United States Patent
Crouch et al.

(10) Patent No.: US 6,969,029 B2
(45) Date of Patent: Nov. 29, 2005

(54) METHODS AND SYSTEMS FOR REMOVING MATERIAL FROM AIRCRAFT FLIGHT SURFACES

(75) Inventors: Jeffrey D. Crouch, Issaquah, WA (US); David W. Foutch, Seattle, WA (US); Matthew C. Smith, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/785,453

(22) Filed: Feb. 23, 2004

(65) Prior Publication Data

US 2005/0224656 A1 Oct. 13, 2005

(51) Int. Cl.[7] ................................................ B64C 1/38
(52) U.S. Cl. ................ 244/134 R; 244/130; 244/129.1
(58) Field of Search ........................ 244/134 R, 134 A, 244/1 R, 53 B, 54, 55, 119, 130, 129.1; B64C 3/00, B64C 47/00

(56) References Cited

U.S. PATENT DOCUMENTS

| 3,460,177 | A | * | 8/1969 | Rhinehart et al. ............ 15/53.1 |
| H535 | H | * | 10/1988 | Sam et al. ..................... 55/296 |
| 4,986,493 | A | * | 1/1991 | Sarh ............................... 244/2 |
| 4,989,084 | A | * | 1/1991 | Wetzel ......................... 348/159 |
| 5,376,443 | A | * | 12/1994 | Sijan et al. ................... 428/332 |
| 5,377,934 | A | * | 1/1995 | Hill .......................... 244/17.11 |
| 5,427,332 | A | * | 6/1995 | Rauckhorst, III et al. .................. 244/134 A |
| 5,915,649 | A | * | 6/1999 | Head ........................... 244/7 A |
| 6,371,415 | B1 | * | 4/2002 | Lorkowski et al. ......... 244/214 |
| 6,405,975 | B1 | * | 6/2002 | Sankrithi et al. ........... 244/1 R |

FOREIGN PATENT DOCUMENTS

DE 3717030 A1 * 11/1988 .......... B64D 47/00

DE 4016850 5/1990

OTHER PUBLICATIONS

Addresses of Suppliers for Soaring Related Products, Nov. 1, 2000 (3 pages) http://www.segelflug.de/segelflieger/guenther.seemann/adr_e.html.
Why to Suffer the Bugs Use, Electric Motorized Bug Wiper (4 page).
Croom, C.C. and Holmes, B.J., "Flight Evaluation of an Insect Contamination Protection System for Laminar Flow Wings," Copyright 1986, Society of Automotive Engineers, Inc. (9 pages).
DG Flugzeugbau GmbH, "A Bug Cleaner with 'Garage'", Jul. 1998 (4 pages) http://www.dg.flugzeugbau.de/mueckenputzer-e.html.
"Bugs and Bugwipers," Soaring, Oct. 2003, p. 21 (1 page).
Wings & Wheels Want-Ads, p. 8 -Netscape (1 page).
Coleman, W. S., "Roughness Due to Insects," Boundary Layer and Flow Control, vol. 2, Pergamon Press, 1961 (pp. 682-747).

* cited by examiner

Primary Examiner—Michael J. Carone
Assistant Examiner—S. A. Holzen
(74) Attorney, Agent, or Firm—Perkins Coie LLP

(57) ABSTRACT

Methods and systems for removing material from aircraft flight surfaces are disclosed herein. In one embodiment, an aircraft nacelle includes an inlet housing having a lip, a wiper positioned at the lip and movable relative to the lip, and a drive assembly positioned at least partially within the inlet housing and operably coupled to the wiper. The drive assembly is configured to move the wiper relative to the inlet housing to remove insect buildup and/or other material from at least a portion of the lip. The inlet housing can further include an interior surface and an exterior surface radially outward of the interior surface. The wiper can include a first end portion proximate to the interior surface and a second end portion proximate to the exterior surface.

35 Claims, 8 Drawing Sheets

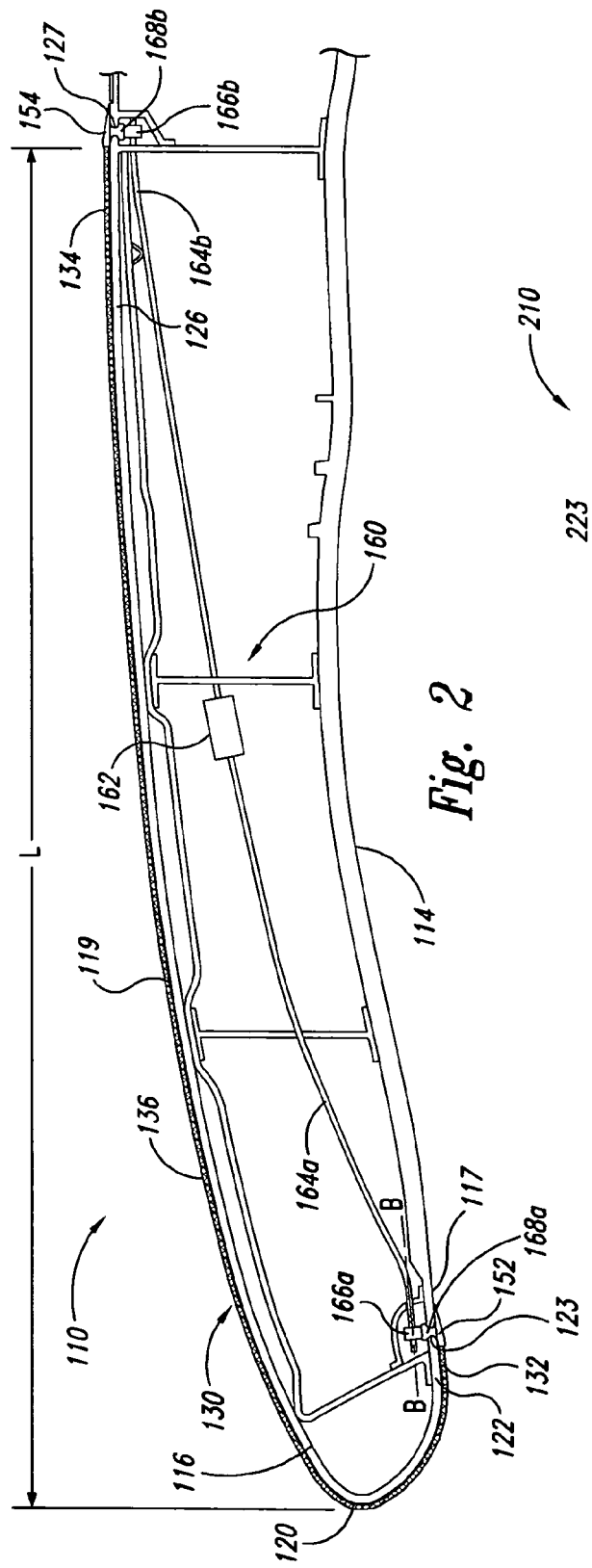
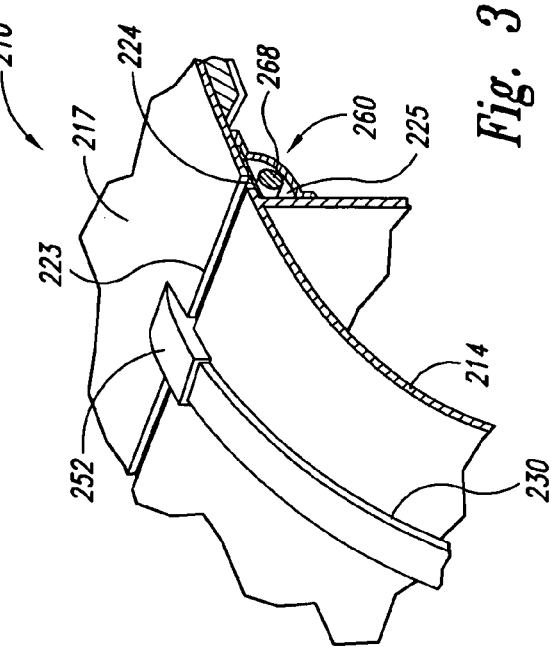

METHODS AND SYSTEMS FOR REMOVING MATERIAL FROM AIRCRAFT FLIGHT SURFACES

TECHNICAL FIELD

This disclosure relates generally to methods and systems for removing insects and/or other material from aircraft flight surfaces.

BACKGROUND

The drag-reduction benefit of having laminar flow on aircraft flight surfaces has been known for many years. Laminar flow is achieved by reducing the magnitude of disturbances and instabilities in the boundary layer. The most robust methods for controlling the disturbance amplitudes are based on modifying the boundary-layer mean flow. These modifications can reduce or suppress the growth of disturbances, assuming the initial level of the disturbances is not excessively large. One of the dominant sources of excessively-large disturbances under typical aircraft operation is insect debris or other material on the aircraft flight surface.

Any insect debris above some critical height causes the laminar air flow over the surface to become turbulent, which increases the aerodynamic drag of the aircraft and reduces fuel efficiency during flight. Typically, insect accumulation occurs at lower altitudes during takeoff, initial climb, final approach, and landing. Removing insect buildup from the aircraft flight surface between flights reduces but does not eliminate the problem because insects may accumulate during the takeoff and initial climb phases of a subsequent flight, thereby adversely affecting the aerodynamic drag of the aircraft during the duration of the flight.

SUMMARY

Several aspects of the invention are directed to systems for removing material from aircraft flight surfaces and methods for manufacturing such systems. An aircraft system in accordance with one aspect includes an inlet housing having a lip, a wiper positioned at the lip and movable relative to the lip, and a drive assembly positioned at least partially within the inlet housing and operably coupled to the wiper. The drive assembly is configured to move the wiper relative to the inlet housing to remove insect buildup and/or other material from at least a portion of the lip. In one aspect of this embodiment, the inlet housing further includes an interior surface and an exterior surface radially outward of the interior surface, and the wiper includes a first end portion proximate to the interior surface and a second end portion proximate to the exterior surface. The system can further include a first attachment device coupling the first end portion to the drive assembly and a second attachment device coupling the second end portion to the drive assembly.

In another aspect of the invention, the drive assembly can include an annular member coupled to the first or second attachment device and a motor operably coupled to the annular member to move the annular member and the wiper relative to the inlet housing. The annular member can be a strap, cable, ring, chain, or other suitable device. In addition to or in lieu of the annular member and motor, the drive assembly can include a cart movable within the inlet housing. The cart is operably coupled to the wiper to move the wiper during a cleaning cycle. In another aspect of this embodiment, the wiper can be a flexible wire or strap that conforms to the surface of the inlet housing to scrape off insect buildup.

Another aspect of the invention is directed to methods of manufacturing a wiping system for use on an aircraft engine inlet housing. The inlet housing can have an interior surface, an exterior surface, and a lip surface extending between the interior and exterior surfaces. In one embodiment, a method includes coupling a wiper to the inlet housing with a first end portion of the wiper at least proximate to the interior surface and a second end portion of the wiper at least proximate to the exterior surface, and coupling a drive assembly to the wiper to move the wiper relative to the inlet housing to remove material from the lip surface during flight. In one aspect of this embodiment, the method further includes coupling an axially resilient member to the wiper to provide tension to the wiper as the wiper moves relative to the inlet housing during a cleaning cycle. The method can further include coupling a cleaning fluid reservoir to the wiper to provide cleaning fluid to the wiper during the cleaning cycle.

BRIEF DESCRIPTION OF THE DRAWINGS

FIG. 2 is a schematic cross-sectional view of the aircraft nacelle taken substantially along line A—A of FIG. 1B.

FIG. 3 is a schematic isometric view of a portion of an aircraft nacelle in accordance with another embodiment of the invention.

DETAILED DESCRIPTION

The following disclosure describes methods and systems for removing insects and/or other material from aircraft flight surfaces. Certain details are set forth in the following description and in FIGS. 1A–11C to provide a thorough understanding of various embodiments of the invention. Other details describing well-known structures and systems often associated with aircraft engines are not set forth in the following disclosure to avoid unnecessarily obscuring the description of various embodiments of the invention.

Many of the details, dimensions, angles, and other features shown in the figures are merely illustrative of particular embodiments of the invention. Accordingly, other embodiments can have other details, dimensions, and/or features without departing from the spirit or scope of the present invention. In addition, further embodiments of the invention may be practiced without several of the details described below, or various aspects of any of the embodiments described below can be combined in different combinations.

A. Embodiments of Aircraft Nacelles

Figure 1A:
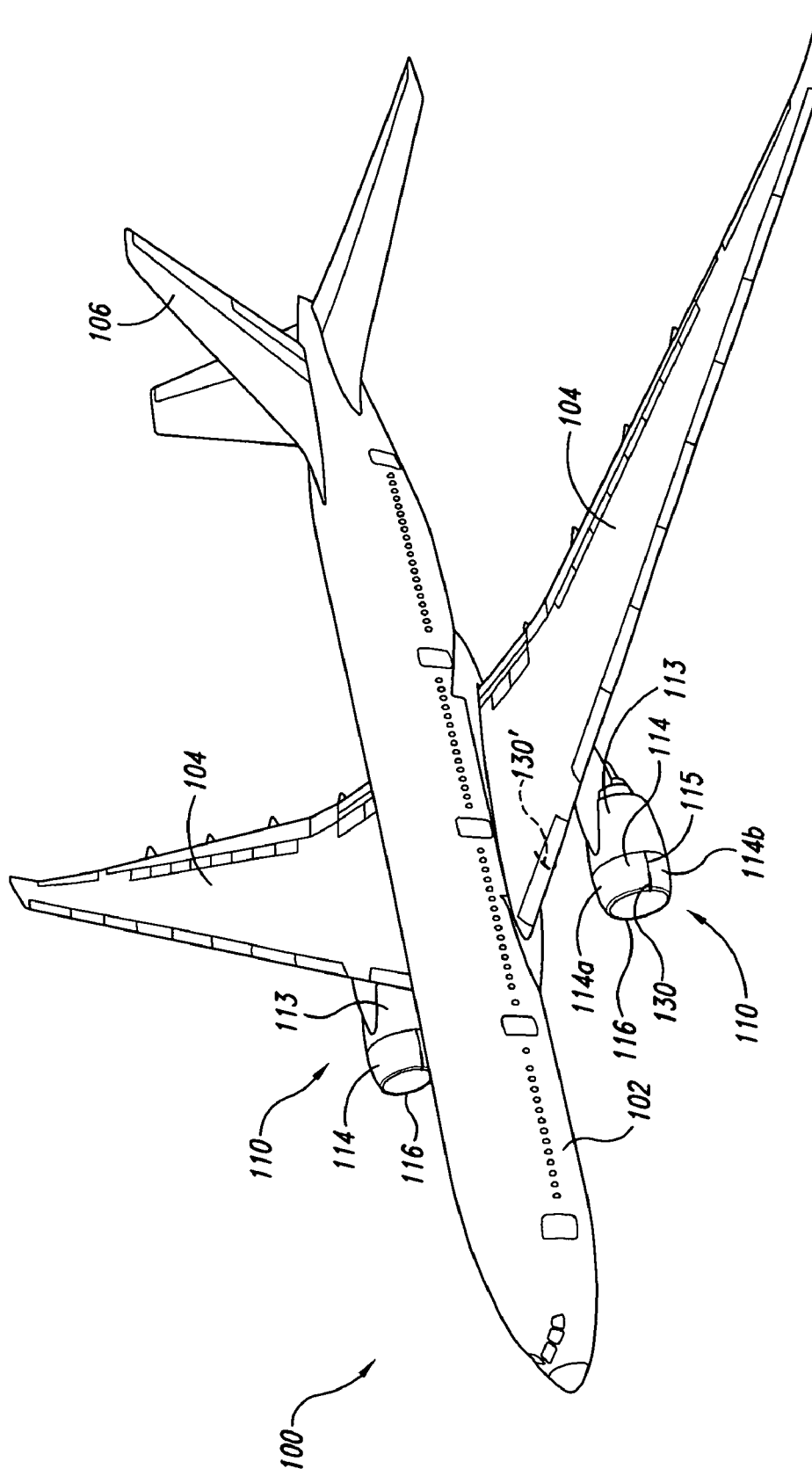
FIG. 1A is a schematic isometric view of an aircraft having a plurality of aircraft nacelles in accordance with one embodiment of the invention.

FIG. 1A is a schematic isometric view of an aircraft 100 having a plurality of nacelles 110 encasing corresponding aircraft engines (not shown) in accordance with one embodiment of the invention. The aircraft 100 can further include a fuselage 102, a plurality of wings 104 attached to the fuselage 102, and a tail 106 attached to the fuselage 102. In the illustrated embodiment, the nacelles 110 are coupled to corresponding wings 104; however, in other embodiments, the nacelles 110 can be coupled to the fuselage 102 and/or tail 106. The individual nacelles 110 include a fan cowling 113, an inlet housing 114 forward of the fan cowling 113, and a wiper 130 movably coupled to the inlet housing 114. The inlet housing 114 includes a forward section with a lip 116 on which insects and other material frequently accumulate while the aircraft 100 flies at low altitudes, such as during the takeoff, initial climb, final approach, and landing. The wiper 130 is positioned and configured to move around the annular lip 116 to remove the insect buildup during a cleaning cycle. In other embodiments, wipers (one of which is shown in broken lines as 130') can be positioned to move across the leading edge of the wings, tail, and/or other flight surfaces.

Figure 1B:
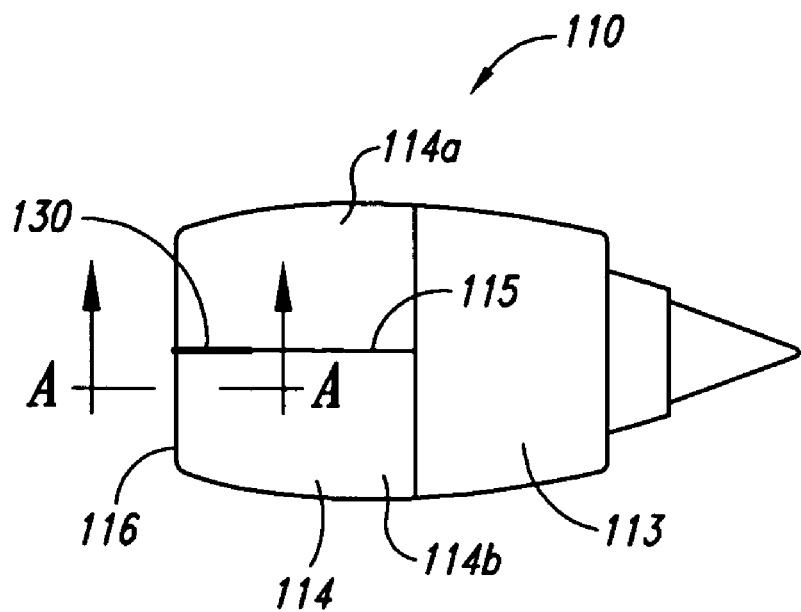
FIG. 1B is a schematic side view of one of the aircraft nacelles of FIG. 1A detached from the aircraft.

FIG. 1B is a schematic side view of one of the aircraft nacelles 110 of FIG. 1A detached from the aircraft 100. The inlet housing 114 of the nacelle 110 can include a first portion 114a and a second portion 114b movable relative to the first portion 114a to allow access to the aircraft engine for maintenance and/or repair. The junction of the first and second portions 114a and 114b includes a channel or groove 115 in which the wiper 130 can be stowed between cleaning cycles. Stowing the wiper 130 in the groove 115 reduces the footprint of the wiper 130 and, therefore, the aerodynamic drag during flight. In other embodiments, the inlet housing 114 can have a different configuration, and/or the wiper 130 may not be stowed in a groove or channel on the inlet housing 114.

Figure 1C:
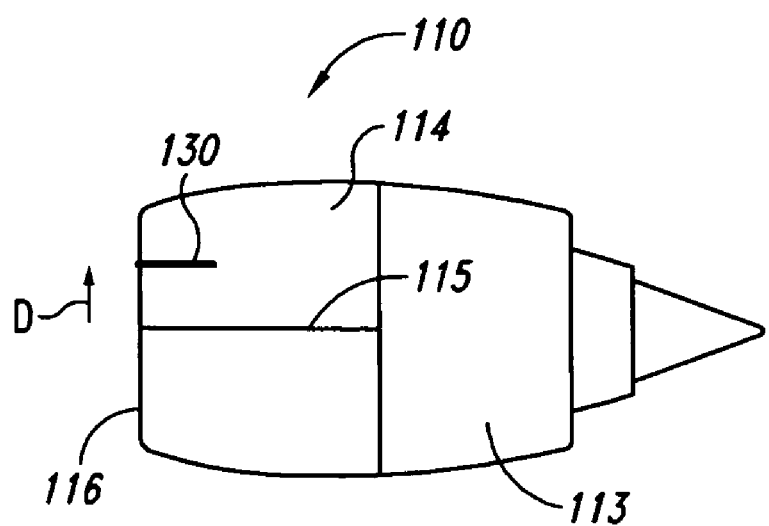
FIG. 1C is a schematic side view of the aircraft nacelle of FIG. 1B with a wiper deployed during a cleaning cycle.

FIG. 1C is a schematic side view of the aircraft nacelle 110 with the wiper 130 deployed during a cleaning cycle. In one cleaning cycle, the wiper 130 can move in a direction D around the inlet housing 114 to remove insect buildup and other material from the lip 116. In other cleaning cycles, the wiper 130 may make two or more passes around the inlet housing 114 and/or move in a different direction.

FIG. 2 is a schematic cross-sectional view of the aircraft nacelle 110 taken substantially along line A—A of FIG. 1B. The inlet housing 114 further includes an interior surface 117 and an exterior surface 119 radially outward of the interior surface 117. The lip 116 connects the interior surface 117 to the exterior surface 119. The wiper 130 includes a first end portion 132 proximate to the interior surface 117, a second end portion 134 proximate to the exterior surface 119, and a filament or body 136 extending between the first and second end portions 132 and 134. The body 136 can be flexible to conform to the contour of the inlet housing 114 so that the wiper 130 can slide over the lip 116, the interior surface 117, and the exterior surface 119 to remove material therefrom during a cleaning cycle.

In one aspect of this embodiment, the wiper 130 can include a wire, strap, or other suitable material with sufficient strength to operate at high air speeds, such as speeds exceeding 100 mph. For example, in one embodiment, the wiper 130 can include a wire having a diameter from approximately 0.006 inch to approximately 0.02 inch. In other embodiments, the wire can have a diameter greater than 0.02 inch or less than 0.006 inch. In another aspect of the illustrated embodiment, the wiper 130 extends a distance L from a leading edge 120 of the lip 116 back over the exterior surface 119. The distance L can be from approximately 1 foot to approximately 2.5 feet. In other embodiments, the distance L can be less than 1 foot or greater than 2.5 feet depending on which sections of the inlet housing are to be cleaned.

The illustrated aircraft nacelle 110 further includes a first attachment device 152 coupled to the first end portion 132 of the wiper 130, a second attachment device 154 coupled to the second end portion 134, and a drive assembly 160 coupled to the first and second attachment devices 152 and 154 to move the wiper 130 around the inlet housing 114. The first and second attachment devices 152 and 154 accordingly secure the ends of the wiper 130 so that the body 136 of the wiper 130 is free to slide around the inlet housing 114. The attachment devices 152 and 154 can have low profiles to minimize their footprints and the associated aerodynamic drag.

The illustrated drive assembly 160 includes a motor 162, a first flexible shaft 164a coupled to the motor 162, a first drive gear 166a coupled to the first flexible shaft 164a, and a first annular member 168a driven by the first drive gear 166a. The first annular member 168a extends around the circumference of the inlet housing 114 and is fixedly attached to the first attachment device 152. The first annular member 168a and the first drive gear 166a can have interlocking gear teeth so that as the drive gear 166a rotates about an axis B—B, the annular member 168a rotates around the inlet housing 114, and in turn moves the first attachment device 152. The first annular member 168a can move through a slot 123 in the inlet housing 114 between the inner acoustic panels 121 and the lip skin 122. The first annular member 168a can be a flexible ring or another suitable member to conform to the shape of the inlet housing 114, while having gear teeth rigid enough to engage the drive gear 166a.

The drive assembly 160 can also be operably coupled to the second attachment device 154 to move the second end portion 134 of the wiper 130. More specifically, the illustrated drive assembly 160 further includes a second flexible shaft 164b coupled to the motor 162, a second drive gear 166b coupled to the second flexible shaft 164b, and a second annular member 168b driven by the second drive gear 166b.

The second annular member 168b can be fixedly attached to the second attachment device 154 and move through a slot 127 in the outer barrel structure 126 of the inlet housing 114. The first and second shafts 164a and 164b can be synchronized so that the first and second attachment devices 152 and 154 move the first and second end portions 132 and 134 of the wiper 130 at the same rate around the inlet housing 114. Alternatively, one end of the wiper 130 can be held in a fixed position while the other end of the wiper 130 moves back-and-forth in a scrubbing motion.

One feature of the illustrated aircraft nacelle 110 is that the wiper 130 can remove insect buildup from the lip 116 and other portions of the inlet housing 114 during flight. Insect buildup causes the laminar air flow across the inlet housing 114 to become turbulent, which increases the aerodynamic drag of the aircraft and reduces the fuel efficiency during flight. Typically, insect buildup occurs at lower altitudes during takeoff, initial climb, final approach, and landing. The illustrated wiper 130, however, can remove the insect buildup during flight after the aircraft reaches a higher altitude. Accordingly, the aircraft can cruise for the duration of the flight without insect buildup causing a disruption to the air flow along the inlet housing 114. In other embodiments, the wiper 130 can perform a cleaning cycle at other times, such as when the aircraft is on the ground. An advantage of any of these embodiments is that the fuel efficiency of the aircraft is expected to improve, for example, by approximately 1 percent.

B. Additional Embodiments of Attachment Devices and Drive Assemblies for Use in Aircraft Nacelles FIG. 3 is a schematic isometric view of a portion of an aircraft nacelle 210 in accordance with another embodiment of the invention. The illustrated aircraft nacelle 210 includes an inlet housing 214, a wiper 230 movable around at least a portion of the inlet housing 214, a first attachment device 252 coupled to the wiper 230, and a drive assembly 260 coupled to the first attachment device 252 to move the wiper 230. The drive assembly 260 includes an annular member 268 attached to the first attachment device 252 and a motor (not shown) coupled to the annular member 268 to move the annular member 268 around the inlet housing 214 in a channel 225. As the annular member 268 moves through the channel 225, the annular member 268 drives the first attachment device 252 through a slot 223 in the inlet housing 214. Unlike the annular member 168 described above with reference to FIG. 2, the annular member 268 can be a cable, strap, or another suitable member received and movable within the channel 225. The inlet housing 214 can also include a split seal 224 in the slot 223 to cover the channel 225 while allowing the first attachment device 252 to move through the slot 223. The split seal 224 can be flush with an interior surface 217 of the inlet housing 214 or recessed in the slot 223. In other embodiments, the annular member 268 can be a flexible shaft that extends around the inlet housing 214. The flexible shaft may not move around the inlet housing 214, but can rotate in place to drive the first attachment device 252.

Figure 4:
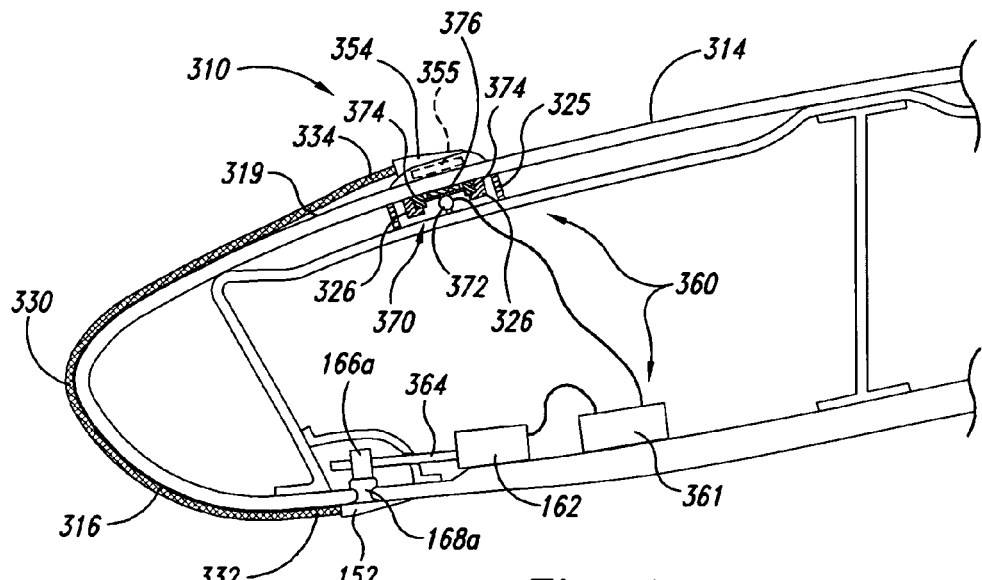
FIG. 4 is a schematic side cross-sectional view of a portion of an aircraft nacelle in accordance with another embodiment of the invention.

FIG. 4 is a schematic side cross-sectional view of a portion of an aircraft nacelle 310 in accordance with another embodiment of the invention. The illustrated aircraft nacelle 310 includes an inlet housing 314, a wiper 330 movable around at least a portion of the inlet housing 314, first and second attachment devices 152 and 354 coupled to the wiper 330, and a drive assembly 360 operably coupled to the first and second attachment devices 152 and 354 to move the wiper 330. The first attachment device 152 couples a first end portion 332 of the wiper 330 to the inlet housing 314 and the drive assembly 360 in a manner generally similar to that described above with reference to FIG. 2. The second attachment device 354 includes a first magnet 355 (shown schematically) that interacts with a corresponding second magnet 376 of the drive assembly 360 to couple a second end portion 334 of the wiper 330 to the inlet housing 314 and the drive assembly 360. The second end portion 334 can be attached to the second attachment device 354 with a ball-and-socket joint to ensure that the tension in the wiper 330 does not apply torque to the attachment device 354. As the second magnet 376 moves around the inlet housing 314, the second magnet 376 pulls the first magnet 355 and the second end portion 334 of the wiper 330 around a corresponding annular path, as described in greater detail below.

The drive assembly 360 includes an electric cart 370 received in a channel 325 of the inlet housing 314 and operably coupled to the second attachment device 354 to move the second end portion 334 of the wiper 330 around the inlet housing 314. The illustrated cart 370 includes a motor 372, a plurality of wheels 374 driven by the motor 372, and the second magnet 376 positioned to interact with the first magnet 355 of the second attachment device 354. The inlet housing 314 includes rails 326 within the channel 325 to guide the wheels 374 so that the cart 370 follows the proper path around the inlet housing 314. The attractive force between the first and second magnets 355 and 376 is sufficient to cause the second attachment device 354 to slide across the exterior surface 319 of the inlet housing 314 as the cart 370 moves correspondingly through the channel 325. The first and second magnets 355 and 376 can include permanent magnets, electromagnets, and/or other suitable magnets.

The drive assembly 360 can further include a motor 162, a shaft 364 coupled to the motor 162, a drive gear 166a coupled to the shaft 364, and an annular member 168a driven by the drive gear 166a. The operation of the motor 162, shaft 364, drive gear 166a, annular member 168a, and first attachment device 152 is generally similar to that described above with reference to FIG. 2. A controller 361 is operably coupled to the motors 162 and 372 to control the movement of the annular member 168a and the cart 370 so that the first and second end portions 332 and 334 of the wiper 330 move around the inlet housing 314 at the same rate.

In one aspect of the illustrated embodiment, the second attachment device 354 can be made of a soft material so that if the device 354 is dislodged and ingested by the engine, the damage to the engine will be minimal. Moreover, the connection between the second end portion 334 and the second attachment device 354 can be designed to fail at a force that is less than the force required to dislodge the second attachment device 354. The wiper 330 can also be made of a soft material so that if the wiper 330 is ingested by the engine, the damage to the engine will be minimal.

One feature of the aircraft nacelle 310 of the illustrated embodiment is that the second attachment device 354 is coupled to the drive assembly 360 by a magnetic force, and therefore the inlet housing 354 does not include a slot similar to the slot 127 described above with reference to FIG. 2. An advantage of this feature is the absence of such a slot improves the air flow characteristics over the exterior surface 319 of the inlet housing 314.

Figure 5:
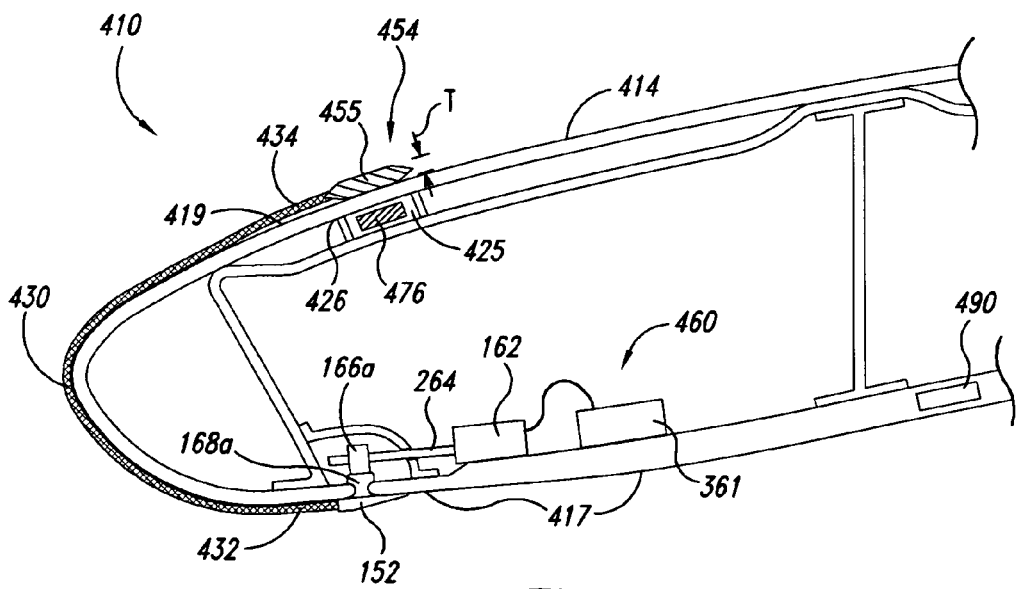
FIG. 5 is a schematic side cross-sectional view of a portion of an aircraft nacelle in accordance with another embodiment of the invention.

FIG. 5 is a schematic side cross-sectional view of a portion of an aircraft nacelle 410 in accordance with another embodiment of the invention. The aircraft nacelle 410 includes an inlet housing 414, a wiper 430 movable around the inlet housing 414, first and second attachment devices 152 and 454 coupled to the wiper 430, and a drive assembly 460 operably coupled to the first attachment device 152 to move the wiper 430. The first attachment device 152 couples a first end portion 432 of the wiper 430 to the inlet housing 414 and the drive assembly 460 in a manner generally similar to that described above with reference to FIG. 2. In this embodiment, however, the drive assembly 460 drives the first end portion 432 of the wiper 430 around the inlet housing 414, while the second attachment device 454 couples a second end portion 432 to the inlet housing 414, which is consequently dragged around the housing 414 by the drive assembly 460. The second attachment device 454 includes a first magnet 455 attached to the second end portion 434 of the wiper 430 and a second magnet 476 disposed within a channel 425 of the inlet housing 414. The attraction between the first and second magnets 455 and 476 securely couples the first end portion 434 of the wiper 430 to the inlet housing 414 as the drive assembly 460 moves the wiper 430 around the housing 414. The channel 425 extends around the inlet housing 414 so that the second magnet 476 can move with the first magnet 455 as the wiper 430 moves.

In one aspect of this embodiment, the first magnet 455 can have a relatively small thickness T to reduce the aerodynamic drag during flight. For example, the thickness T can be approximately 0.08 inch in one embodiment, and can have other values in other embodiments. The first magnet 455 can be coated with a suitable material to allow the magnet 455 to slide easily over the exterior surface 419 of the housing 414 during a cleaning cycle. In another aspect of this embodiment, the aircraft nacelle 410 can include a capture magnet 490 within the inlet housing 414 adjacent to the interior surface 417. The capture magnet 490 can capture the first magnet 455 if the first magnet 455 becomes dislodged during flight before it enters the aircraft engine.

In another aspect of this embodiment, the thickness of a panel 426 of the inlet housing 414 separating the first and second magnets 455 and 476 can be sufficiently thin so as not to interfere with the attractive force between the first and second magnets 455 and 476. For example, the panel 426 can have a thickness of approximately 0.04 inch in one embodiment, and can have other values in additional embodiments depending on the strength of the magnets 455 and 476. In additional embodiments, the second magnet 476 can be replaced by a material such as steel that is attracted to the first magnet 455 but is not itself magnetized. In other embodiments, the second magnet 476 can be replaced by a strip of material that extends around the inlet housing 414. The strip can be a magnet or a material attracted to a magnet to secure the first magnet 455 to the inlet housing 414 as the wiper 430 moves around the housing 414. In additional embodiments, such as that described below with reference to FIG. 6, the second attachment device 454 can be driven directly by the drive assembly.

Figure 6:
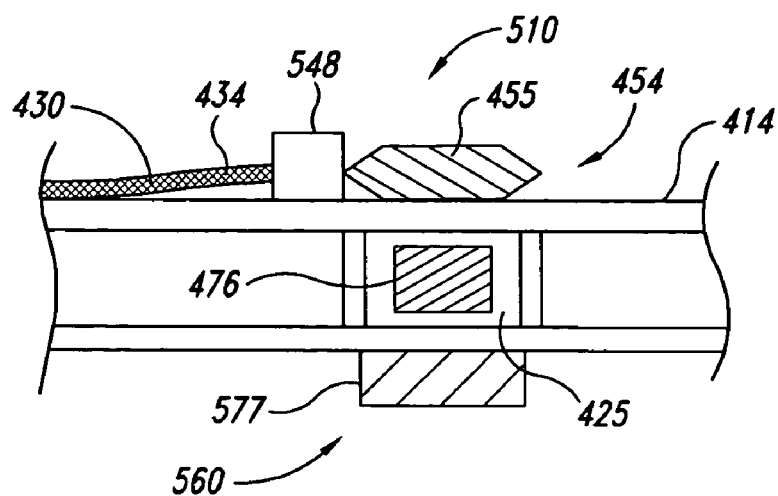
FIG. 6 is a schematic side cross-sectional view of a portion of an aircraft nacelle in accordance with another embodiment of the invention.

FIG. 6 is a schematic side cross-sectional view of a portion of an aircraft nacelle 510 in accordance with another embodiment of the invention. The illustrated aircraft nacelle 510 includes an inlet housing 414, a wiper 430 movable around the inlet housing 414, a second attachment device 454 coupled to the wiper 430, and a drive assembly 560 operably coupled to the second attachment device 454 to move the second end portion 434 of the wiper 430. The second attachment device 454 includes a first magnet 455 coupled to a second portion 434 of the wiper 430 and a second magnet 476 disposed within a channel 425 of the inlet housing 414. The drive assembly 560 includes a drive magnet 577 that moves around the inlet housing 414 and a motor (not shown) to move the drive magnet 577. The drive magnet 577 moves the second magnet 476 around the inlet housing 414, which in turn drives the first magnet 455 to move the wiper 430 around the inlet housing 414. In other embodiments, the second magnet 476 can be replaced by a non-magnetized, ferrous material.

In one aspect of this embodiment, the aircraft nacelle 510 further includes an axially resilient member 548 (shown schematically) coupled between the second end portion 434 of the wiper 430 and the first magnet 455. The axially resilient member 548 can be a spring or another suitable device to provide tension to the wiper 430 during a cleaning cycle. The tension ensures the wiper 430 remains in contact with the surface of the inlet housing 414 to remove insect buildup or other material. In other embodiments, the nacelle 510 may not include the axially resilient member 548 and the wiper 430 can be made of an elastic material.

Figure 7:
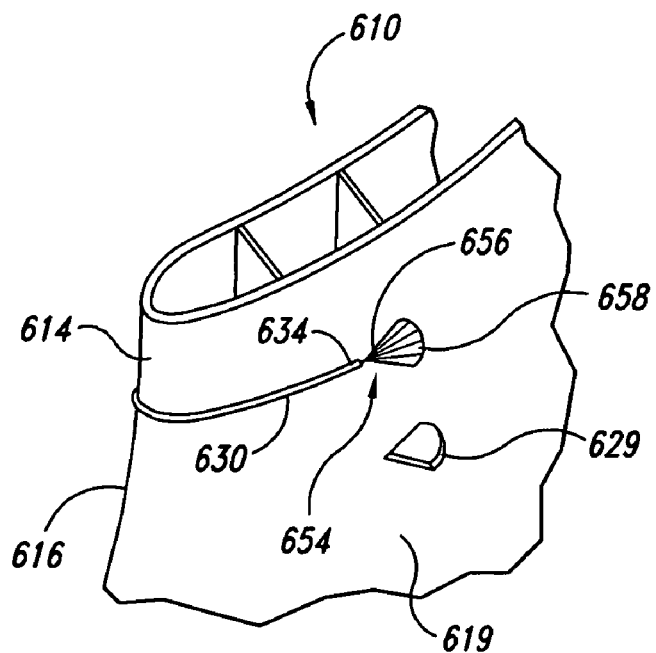
FIG. 7 is a schematic isometric view of a portion of an aircraft nacelle in accordance with another embodiment of the invention.

FIG. 7 is a schematic isometric view of a portion of an aircraft nacelle 610 in accordance with another embodiment of the invention. The illustrated aircraft nacelle 610 includes an inlet housing 614, a wiper 630 movable around the inlet housing 614, and a drag member 654 attached to the wiper 630 to apply tension to the wiper 630 during a cleaning cycle. The wiper 630 includes a first end portion (not shown) coupled to a drive assembly to move the wiper 630 around the inlet housing 614 and a second free end portion 634 attached to the drag member 654. The drag member 654 can have a conical, wedge, or other suitable configuration to create aerodynamic drag, and thereby provide tension to the wiper 630 during flight. More specifically, the illustrated drag member 654 includes a first portion 656 having a first cross-sectional area proximate to the wiper 630 and a second portion 658 having a second cross-sectional area greater than the first cross-sectional area. Because the section of the wiper 630 adjacent to the drag member 654 is spaced apart from the inlet housing 614, the wiper 630 can have a longer length to ensure the wiper 630 contacts the desired region of the inlet housing 614.

In one aspect of this embodiment, the inlet housing 614 includes a recess 629 positioned to receive the drag member 654 after a cleaning cycle. The recess 629 can be sized and configured to receive the drag member 654 such that the member 654 does not create aerodynamic drag when it is stowed. For example, the recess 629 can have edges that are flush with the drag member 654 when the drag member 654 is stowed. In one aspect of this embodiment, the drag member 654 can be made of soft rubber or foam, and magnets can be used to retain the drag member 654 in the recess 629. For example, the drag member 654 can include a permanent magnet and the inlet housing 614 can include an electromagnet that is selectively activated to attract the permanent magnet and stow the drag member 654. In other embodiments, the inlet housing 614 can include a compartment with a door that opens to release the drag member 654 and closes to stow the member 654.

Figure 8:
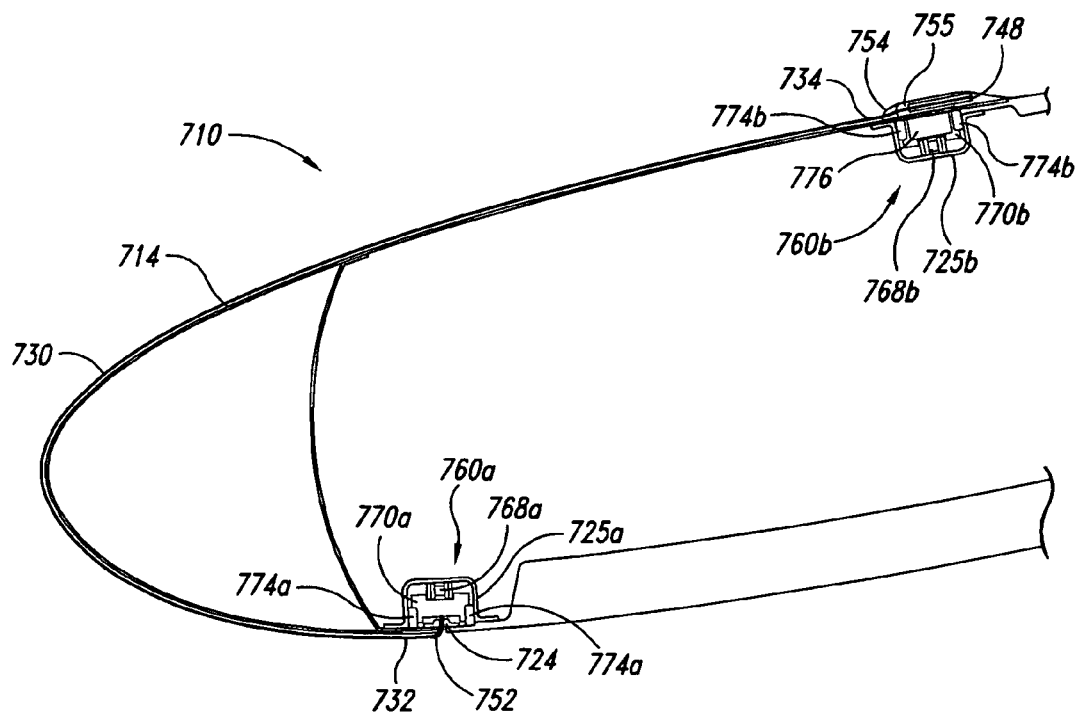
FIG. 8 is a schematic side cross-sectional view of a portion of an aircraft nacelle in accordance with another embodiment of the invention.

FIG. 8 is a schematic side cross-sectional view of a portion of an aircraft nacelle 710 in accordance with another embodiment of the invention. The illustrated nacelle 710 includes an inlet housing 714, a wiper 730 movable around at least a portion of the inlet housing 714, and first and second drive assemblies 760a–b operably coupled to move the wiper 730. The illustrated first drive assembly 760a includes a first movable cart 770a with wheels 774a and a first annular member 768a attached to the cart 770a. The first annular member 768a can be a plastic chain, ring, strap, or other suitable member driven by a sprocket or other driving mechanism to move the first member 768a and the first cart 770a through a first channel 725a of the inlet housing 714.

The illustrated nacelle 710 further includes a first attachment device 752 attached to the first cart 770a to couple a first end portion 732 of the wiper 730 to the first drive assembly 760a. The wiper 730 can be attached directly to the first attachment device 752, or alternatively, the wiper 730 can extend through the first attachment device 752 and be coupled to the cart 770a. In either case, the first drive assembly 760a moves the first end portion 732 of the wiper 730 across the inlet housing 714 as the assembly 760a travels through the first channel 725a. The inlet housing 714 may further include a split seal 724 through which the first attachment device 752 projects as the device 752 moves around the housing 714.

The illustrated nacelle 710 further includes a second attachment device 754 attached to a second end portion 734 of the wiper 730. The second attachment device 754 includes a first magnet 755 that interacts with a second magnet 776 of the second drive assembly 760b to couple the wiper 730 to the inlet housing 714 and second drive assembly 760b. The illustrated second attachment device 754 further includes a spring or other axially resilient member 748 attached to the second end portion 734 to provide tension to the wiper 730 as the wiper 730 moves around the inlet housing 714.

The illustrated second drive assembly 760b includes a second movable cart 770b and a second annular member 768b attached to the cart 770b, both of which are received in a second channel 725b of the inlet housing 714. The second cart 770b includes the second magnet 776 positioned to interact with the first magnet 755 and a plurality of wheels 774b so that the cart 770b can move through the second channel 725b. The attractive force between the first and second magnets 755 and 776 is sufficient to cause the second attachment device 754 to slide across the exterior surface of the inlet housing 714 as the second cart 770b moves correspondingly through the second channel 725b. The second annular member 768b can be a chain, ring, strap, or other suitable member driven by a sprocket or other driving mechanism to move the member 768b and second cart 770b through the second channel 725b.

Figure 9:
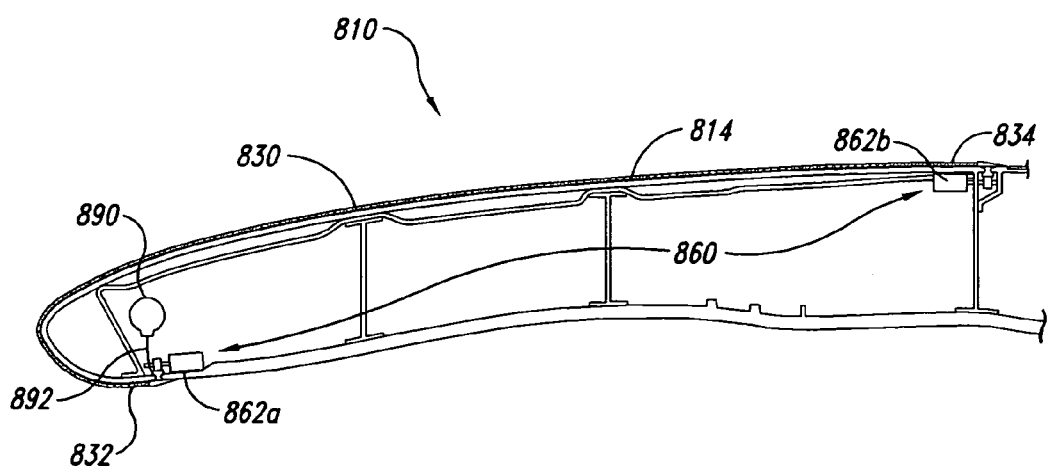
FIG. 9 is a schematic side cross-sectional view of a portion of an aircraft nacelle in accordance with another embodiment of the invention.

FIG. 9 is a schematic side cross-sectional view of a portion of an aircraft nacelle 810 in accordance with another embodiment of the invention. The illustrated aircraft nacelle 810 includes an inlet housing 814, a wiper 830 movable around the housing 814, and a drive assembly 860 to move the wiper 830. The drive assembly 860 can be generally similar to the drive assembly 160 described above with reference to FIG. 2. The drive assembly 860, however, includes a first motor 862a to move a first end portion 832 of the wiper 830 and a second motor 862b to move a second end portion 834 of the wiper 830. The drive assembly 860 can include a controller (not shown) operably coupled to the first and second motors 862a and 862b so that the first and second motors 862a and 862b move the ends of the wiper 830 at the same rate around the inlet housing 814. Alternatively, one end of the wiper 830 can be held in a fixed position while the motor coupled to the other end of the wiper 830 moves that end of the wiper 830 back-and-forth in a scrubbing motion.

The aircraft nacelle 810 can further include a cleaning fluid reservoir 890 and a fluid conduit 892 to provide cleaning fluid to the wiper 830 before, after, and/or during a cleaning cycle. The cleaning fluid facilitates the removal of insect buildup and other material that are attached to the surface of the inlet housing 814. The cleaning fluid can be pumped with high pressure air, $CO_2$, or another suitable device to the wiper 830. In other embodiments, the system 810 can include a plurality of fluid conduits to provide cleaning fluid to the wiper, and/or the cleaning fluid can wick through a medium to the wiper 830.

C. Additional Embodiments of Wipers for use in Aircraft Nacelles

Figure 10A:
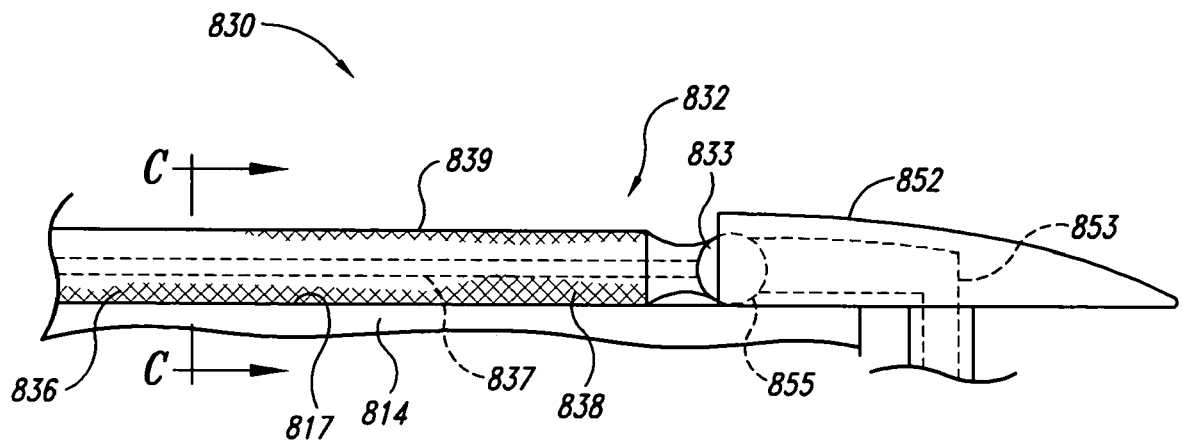
FIG. 10A is a schematic side view of a wiper and an attachment device in accordance with another embodiment of the invention.
Figure 10B:
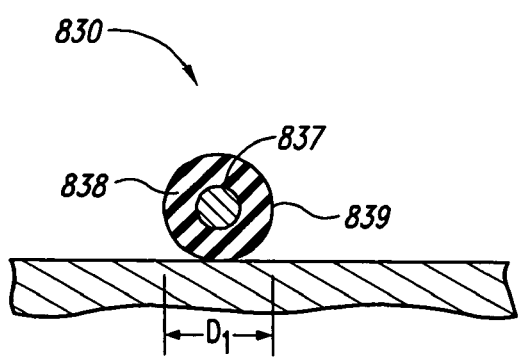
FIG. 10B is a schematic cross-sectional view taken substantially along line C—C of FIG. 10A.

FIG. 10A is a schematic side view of a wiper 830 and an attachment device 852 for use in aircraft nacelles in accordance with another embodiment of the invention. FIG. 10B is a schematic cross-sectional view taken substantially along line C—C of FIG. 10A. Referring to both FIGS. 10A and 10B, the wiper 830 includes a first end portion 832 coupled to the attachment device 852 and a body 836 coupled to the first end portion 832 to remove material from a surface 817 of an inlet housing 814. The body 836 can include a fluid conduit 837 extending at least approximately the length of the wiper 830, a wicking material 838 radially outward of the fluid conduit 837, and a cover 839 over the wicking material 838. The fluid conduit 837 is in fluid communication with a coupling conduit 853 in the attachment device 852 to carry cleaning fluid through the wiper 830. The fluid conduit 837 can include apertures (not shown) to provide the cleaning fluid to the wicking material 838, which in turn wicks the fluid to the cover 839. The cover 839 can be a nylon mesh or other suitable material through which the cleaning fluid can pass. In additional embodiments, the wiper 830 may not include the fluid conduit 837, and the wicking material 838 can wick the cleaning fluid from the coupling conduit 853 along the length of the wiper 830.

In one aspect of the embodiment shown in FIGS. 10A–10B, the body 836 can have a diameter $D_1$ from approximately 0.125 inch to approximately 0.5 inch. In other embodiments, the diameter of the body 836 can be less than 0.125 inch or greater than 0.5 inch. In another aspect of this embodiment, the first end portion 832 includes a ball 833 and the attachment device 852 includes a socket 855 to receive the ball 833. The ball-and-socket connection between the wiper 830 and the attachment device 852 reduces the likelihood that the body 836 will twist, which can cause the wiper 830 to break.

Figure 11A:
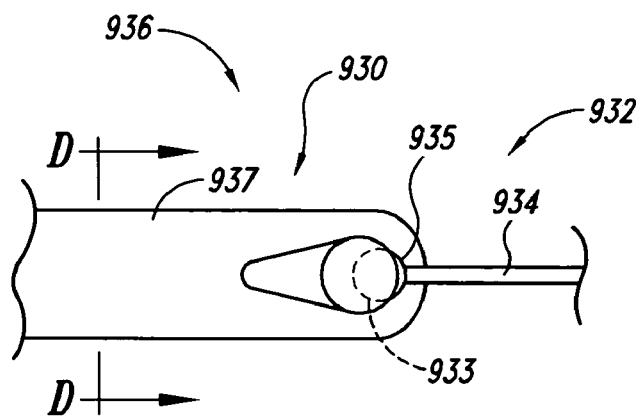
FIG. 11A is a schematic top view of a wiper in accordance with another embodiment of the invention.
Figure 11B:
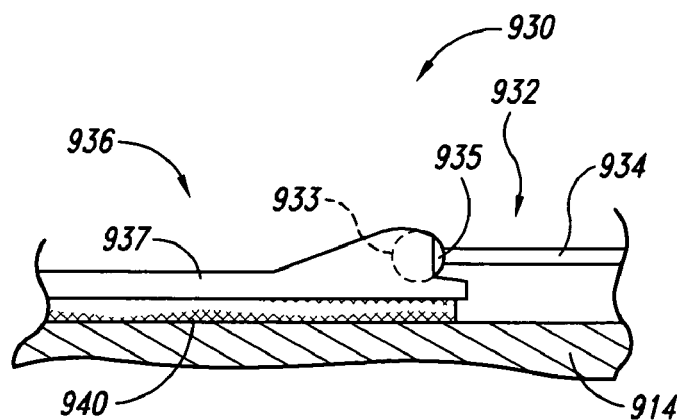
FIG. 11B is a schematic side view of the wiper of FIG. 11A.
Figure 11C:
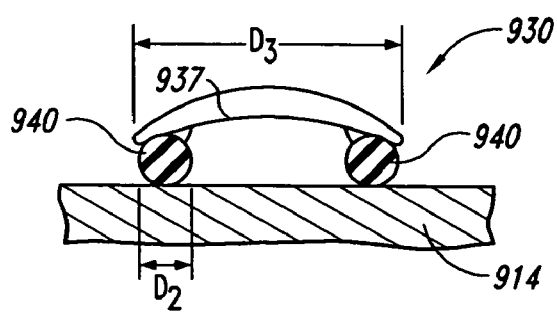
FIG. 11C is a cross-sectional view of the wiper taken substantially along the line D—D of FIG. 11A.

FIG. 11A is a schematic top view and FIG. 11B is a schematic side view of a wiper 930 in accordance with another embodiment of the invention. FIG. 11C is a cross-sectional view taken substantially along the line D—D of FIG. 11A. Referring to FIGS. 11A–11C, the illustrated wiper 930 includes a first end portion 932 for coupling to an attachment device, and a body 936 attached to the first end portion 932. The body 936 includes a carrier 937 and a plurality of cleaning elements 940 attached to the carrier 937. In the illustrated embodiment, the wiper 930 includes two cleaning elements 940 each having a diameter $D_2$ of approximately 0.125 inch, and the carrier 937 has a width $D_3$ from approximately 0.75 inch to approximately 1.0 inch. In other embodiments, the body 936 can include a different number of cleaning elements 940, the diameter of the cleaning elements 940 can be less than or greater than 0.125 inch, and/or the carrier 937 can have a different width $D_3$. The illustrated carrier 937 includes a socket 933, and the illustrated first end portion 932 includes a cord 934 with a ball 935 received in the socket 933. The cord 934 can be attached to an attachment device to move the wiper 930 around the inlet housing 914. In other embodiments, the wiper can have other configurations.

In additional embodiments, a wiper can be used in conjunction with a "goo" or other relatively viscous material that is deposited on the lip of the inlet housing and/or other flight surface before takeoff. The material can accumulate insects during flight at lower altitudes and then separate from the lip, taking the insects with it. Alternatively, the wiper may scrape off or otherwise remove the material and the insects during a cleaning cycle.

From the foregoing, it will be appreciated that specific embodiments of the invention have been described herein for purposes of illustration, but that various modifications may be made without deviating from the spirit and scope of the invention. For example, many of the features, such as the wipers, attachment devices, and drive assemblies, described above can be combined in different combinations to form additional embodiments. Furthermore, these feature can be used on wind turbines, airships, and other devices with flow surfaces. Accordingly, the invention is not limited except as by the appended claims.

We claim:

1. An aircraft system, comprising:

an inlet housing having a lip;

a wiper positioned at the lip and movable relative to the lip; and a drive assembly positioned at least partially within the inlet housing and operably coupled to the wiper, the drive assembly being configured to move the wiper relative to the inlet housing to remove material from at least a portion of the lip.

2. The aircraft of claim 1 wherein:

the inlet housing further includes an interior surface and an exterior surface radially outward of the interior surface;

the wiper includes a first end portion at least proximate to the interior surface and a second end portion at least proximate to the exterior surface; and the system further comprises a first attachment device coupling the first end portion to the inlet housing and a second attachment device coupling the second end portion to the inlet housing.

3. The aircraft of claim 1 wherein:

the wiper includes a first end portion and a second end portion opposite the first end portion;

the system further comprises an attachment device coupled to the first end portion of the wiper; and the drive assembly includes an annular member coupled to the attachment device and a motor operably coupled to the annular member to move the annular member and the first end portion of the wiper relative to the inlet housing.

4. The aircraft of claim 1 wherein:

the wiper includes a first end portion and a second end portion opposite the first end portion;

the system further comprises an attachment device coupled to the first end portion of the wiper;

the drive assembly includes an annular member coupled to the attachment device and a motor operably coupled to the annular member to move the annular member and the first end portion of the wiper relative to the inlet housing; and the annular member includes a strap, a cable, a chain, and/or a ring.

5. The aircraft of claim 1 wherein:

the wiper includes a first end portion and a second end portion opposite the first end portion;

the system further comprises an attachment device coupled to the first end portion of the wiper; and the drive assembly includes a cart movable within the inlet housing and operably coupled to the attachment device to move the first end portion of the wiper.

6. The aircraft of claim 1 wherein:

the wiper includes a first end portion and a second end portion opposite the first end portion;

the system further comprises an attachment device coupled to the first end portion of the wiper, the attachment device having a first magnet; and the drive assembly includes a cart having a second magnet and being movable relative to the inlet housing, the first and second magnets being positioned to interact so that the attachment device moves with the cart.

7. The aircraft of claim 6 wherein the wiper is configured to fail at a force less than a force required to dislodge the attachment device.

8. The aircraft of claim 1 wherein:

the wiper includes a first end portion coupled to the drive assembly and a second end portion opposite the first end portion; and the system further comprises a drag member having a first portion coupled to the second end portion of the wiper and a second portion opposite the first portion, the drag member being movable between a stowed position and a deployed position, with the second portion of the drag member being unsecured to the inlet housing when the drag member is in the deployed position.

9. The aircraft of claim 1 wherein:

the wiper includes a first end portion coupled to the drive assembly and a second end portion opposite the first end portion;

the system further comprises a drag member having a first portion coupled to the second end portion of the wiper and a second portion opposite the first portion, the drag member being movable between a stowed position and a deployed position, with the second portion of the drag member being unsecured to the inlet housing when the drag member is in the deployed position; and the inlet housing has a recess sized and positioned to receive the drag member in the stowed position.

10. The aircraft of claim 1 wherein the wiper includes a wire.

11. The aircraft of claim 1 wherein the wiper includes a strap.

12. The aircraft of claim 1, further comprising an axially resilient member positioned to provide tension to the wiper as the wiper moves relative to the inlet housing during a cleaning cycle.

13. The aircraft of claim 1, further comprising a cleaning fluid reservoir and a fluid conduit in fluid communication with the wiper and the fluid reservoir to provide cleaning fluid to the wiper.

14. The aircraft of claim 1 wherein:

the wiper includes a wicking material to move cleaning fluid through at least a portion of the wiper; and the system further comprises a cleaning fluid reservoir in fluid communication with the wicking material.

15. The aircraft of claim 1 wherein:

the inlet housing further includes a first portion, a second portion, and a groove between the first and second portions; and the drive assembly is configured to move the wiper from a stowed position in which the wiper is received at least partially in the groove and a deployed position in which the wiper is external to the groove.

16. The aircraft of claim 1 wherein:
the lip of the inlet housing has a contour; and
the wiper is flexible to generally conform to the contour of the lip.

17. The aircraft of claim 1 wherein:
the lip has a generally annular configuration; and
the drive system is configured to move the wiper around the annular lip.

18. The aircraft of claim 1 wherein the drive assembly is configured to move the wiper relative to the inlet housing to remove material during flight at an air speed of greater than 100 mph.

19. The aircraft of claim 1, further comprising:
a wing coupled to the inlet housing;
a fuselage attached to the wing; and
a tail coupled to the fuselage.

20. The aircraft of claim 1 wherein the wiper includes:
a body having a carrier and a plurality of discrete cleaning elements attached to the carrier; and
a cord coupled to the carrier and the drive assembly to move the wiper relative to the inlet housing.

21. An aircraft system, comprising:
an inlet housing including a contoured exterior aircraft surface and a leading edge;
a wiper having a first end portion, a second end portion, and a body extending between the first and second end portions, with at least a portion of the body contacting the leading edge; and
a drive assembly operably coupled to at least one of the first and second end portions to move the wiper relative to the surface to remove material from the leading edge during flight at an air speed of greater than 100 mph.

22. The system of claim 21, further comprising an attachment device coupled to the first end portion of the wiper, wherein the drive assembly includes an annular member connected to the attachment device and a motor operably coupled to the annular member to move the annular member and the first end portion of the wiper relative to the leading edge.

23. The system of claim 21, further comprising an attachment device coupled to the first end portion of the wiper, wherein the drive assembly includes a cart movable within the inlet housing and operably coupled to the attachment device to move the first end portion of the wiper.

24. The system of claim 21 wherein the body of the wiper includes at least one of a wire and a strap.

25. An aircraft system, comprising:
a contoured exterior aircraft surface defining a leading edge;
a wiper having a first end portion, a second end portion, and a body extending between the first and second end portions, with at least a portion of the body contacting the leading edge; and
a drive assembly operably coupled to at least one of the first and second end portions to move the wiper relative to the surface to remove material from the leading edge during flight at an air speed of greater than 100 mph;
wherein the drive assembly includes:
a first motor operably coupled to the first end portion of the wiper to move the first end portion relative to the surface; and
a second motor operably coupled to the second end portion of the wiper to move the second end portion relative to the surface.

26. The system of claim 21, further comprising:
a wing coupled to the inlet housing;
a fuselage attached to the wing; and
a tail coupled to the fuselage.

27. An aircraft system, comprising:
an inlet housing having a lip;
wiping means for removing material from at least a portion of the lip during flight; and
driving means for moving the wiping means relative to the lip, the driving means being operably coupled to the wiping means and positioned at least partially within the inlet housing.

28. The system of claim 27 wherein the wiping means includes at least one of a wire and a strap.

29. The system of claim 27 wherein the driving means includes:
an annular member coupled to the wiping means; and
a motor operably coupled to the annular member to move the annular member and the wiping means relative to the lip.

30. The system of claim 27 wherein the driving means includes a cart movable within the inlet housing and operably coupled to the wiping means to move the wiping means relative to the lip.

31. The system of claim 27 wherein:
the inlet housing further includes an interior surface and an exterior surface radially outward of the interior surface; and
the wiping means includes a first wiping portion for wiping at least a portion of the interior surface and a second wiping portion for wiping at least a portion of the exterior surface.

32. An aircraft system, comprising:
an inlet housing having an exterior surface, an interior surface radially inward of the exterior surface, and a lip surface extending between the exterior and interior surfaces;
a wiper having a first end portion proximate to the interior surface, a second end portion proximate to the exterior surface, and a body extending between the first and second end portions, the body being flexible to generally conform to the lip surface;
an attachment device coupled to the first end portion of the wiper; and
a drive assembly including an annular member operably coupled to the attachment device and a motor operably coupled to the annular member to move the wiper across the inlet housing and remove insects from at least a portion of the lip surface during flight.

33. The system of claim 32 wherein the wiper includes at least one of a wire and a strap.

34. The system of claim 32 wherein:
the attachment device is a first attachment device;
the system further comprises a second attachment device attached to the second end portion of the wiper; and
the drive assembly further includes a cart movable within the inlet housing and operably coupled to the second attachment device to move the second end portion of the wiper.

35. The system of claim 32 wherein:
the lip surface has a generally annular configuration; and
the drive system is configured to move the wiper around the annular lip surface.

* * * * *